W. H. ALLEN.
AUTOMATIC BRICK HANDLING MACHINE.
APPLICATION FILED APR. 17, 1914.
1,125,630.
Patented Jan. 19, 1915.
2 SHEETS—SHEET 1.
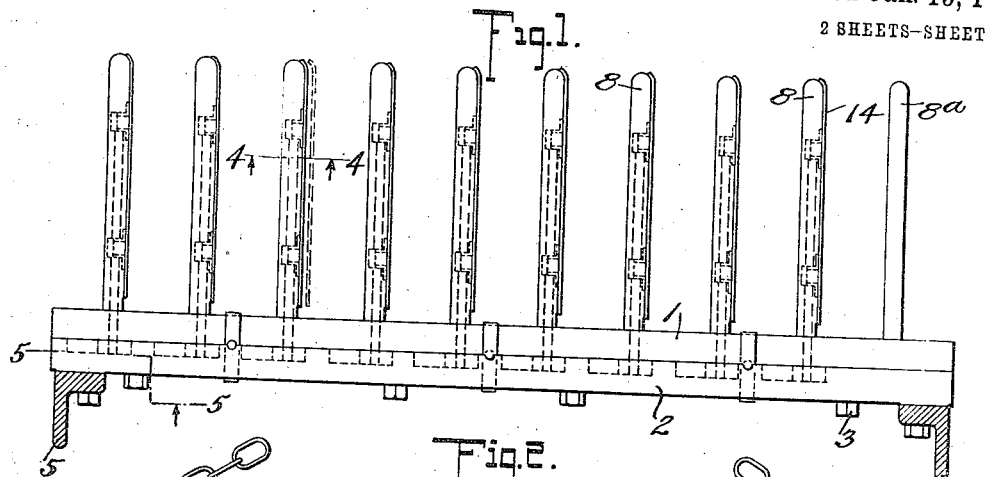
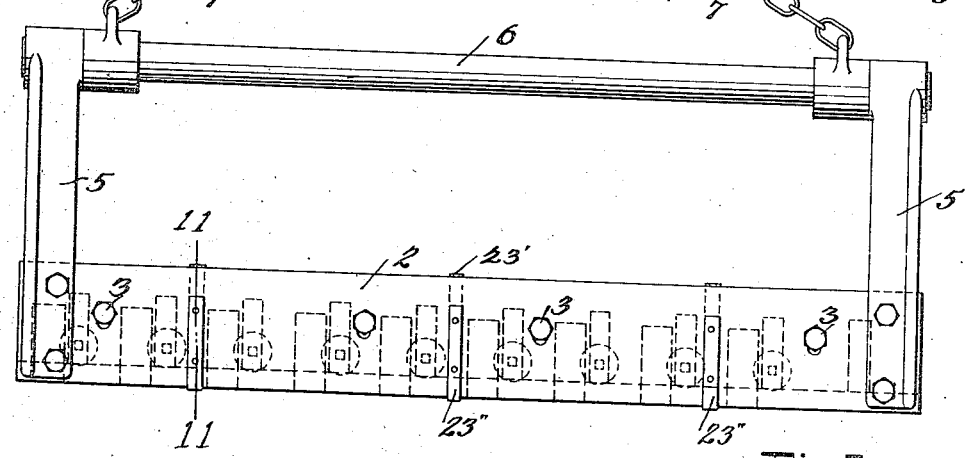
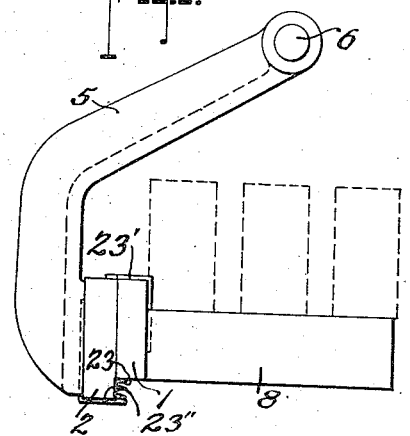
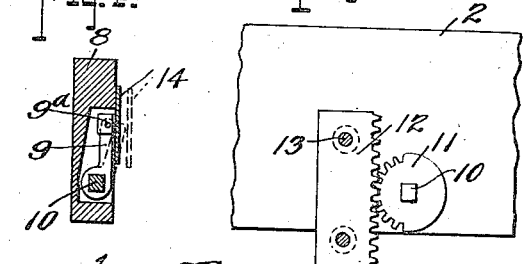
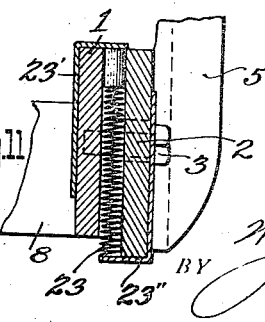
WITNESSES:
C. H. Wagner,
L. Compton
INVENTOR.
W. H. Allen
BY Robert Robb
ATTORNEYS.

W. H. ALLEN.
AUTOMATIC BRICK HANDLING MACHINE.
APPLICATION FILED APR. 17, 1914.
1,125,630.
Patented Jan. 19, 1915.
2 SHEETS—SHEET 2.
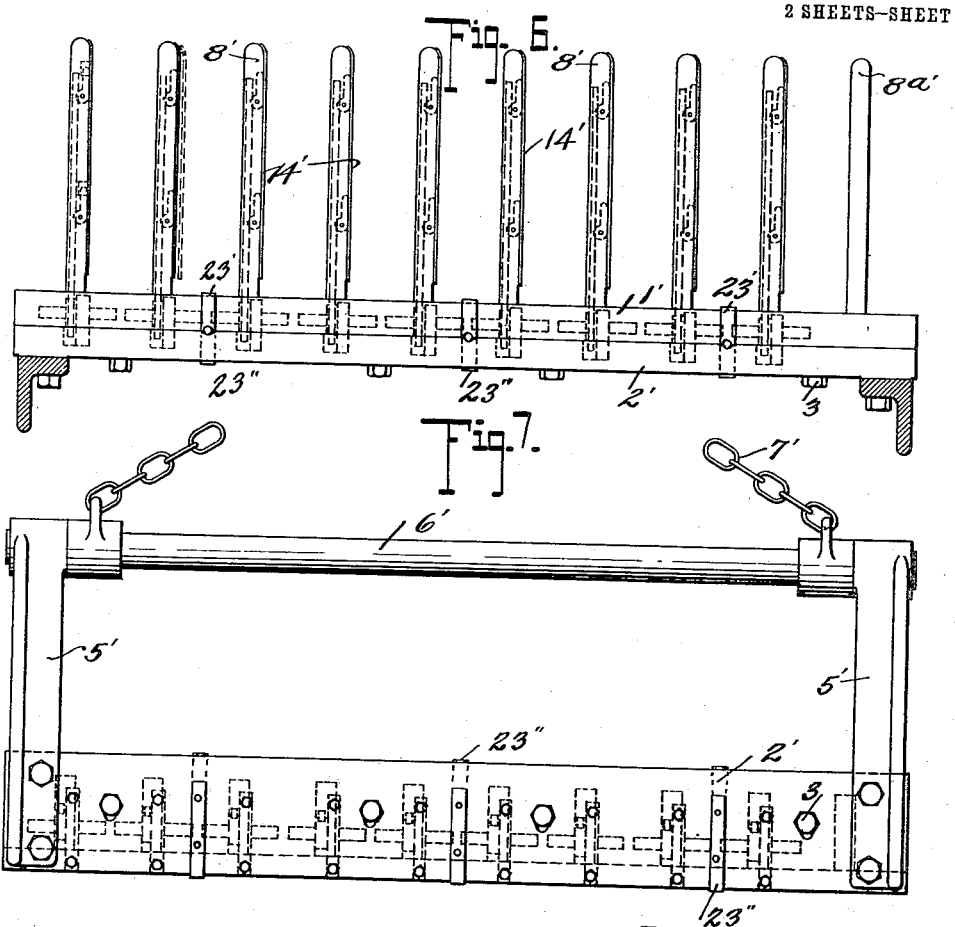
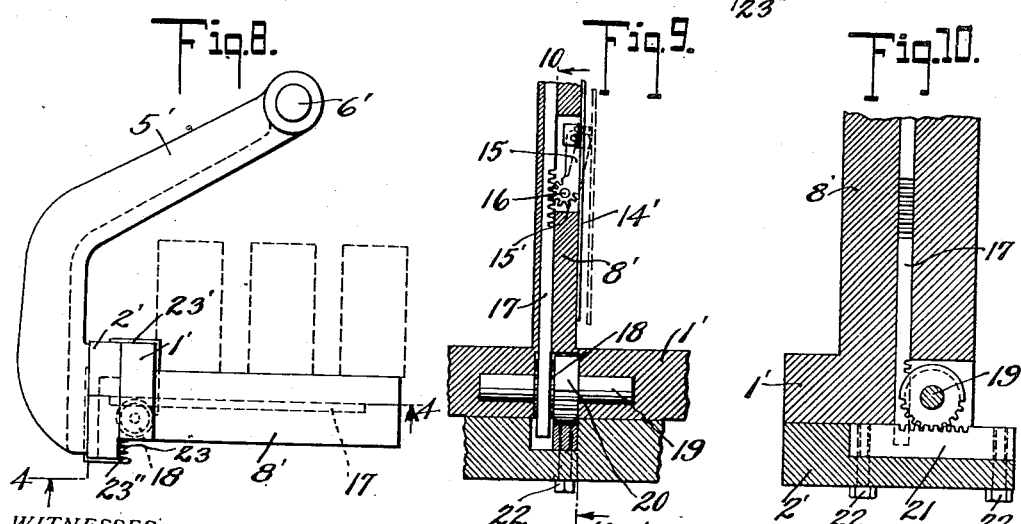
WITNESSES:
INVENTOR.
BY
ATTORNEYS

UNITED STATES PATENT OFFICE.

WILLIAM H. ALLEN, OF MOMENCE, ILLINOIS, ASSIGNOR OF ONE-HALF TO O. E. COOK, OF GRANT PARK, ILLINOIS.

AUTOMATIC BRICK-HANDLING MACHINE.

1,125,630.  Specification of Letters Patent.  Patented Jan. 19, 1915.

Application filed April 17, 1914. Serial No. 832,533.

*To all whom it may concern:*

Be it known that I, WILLIAM H. ALLEN, a citizen of the United States, residing at Momence, in the county of Kankakee and State of Illinois, have invented certain new and useful Improvements in Automatic Brick-Handling Machines, of which the following is a specification.

This invention is a machine for facilitating the handling of bricks.

The invention embodies improvements in that type of machines comprising a plurality of lifting members arranged in spaced relation so as to be inserted between spaced bricks arranged in a row, together with means for actuating these lifting members whereby to cause the same to engage and grip the bricks firmly so that the latter may be carried off to a suitable point of deposit.

The improvements embodied in this invention involve primarily the lifting members and certain associated gripping devices that are capable of being actuated upon grasping a suitable handle or equivalent part and raising the machine to lift the engaged row of bricks preliminary to carrying the same off.

An especial object of the invention has been to produce a brick handling machine wherein the gripping means and the actuating mechanism therefor are very simple in arrangement and construction, comprised of as few parts as practicable, and possessed of great durability and substantiality so as to stand the utmost wear and tear which machines of this sort are subjected to under practical conditions of service.

A complete understanding of the invention including the details of construction and the advantages thereof will be readily had on review of the following description, and reference to the appended drawings wherein, Figure 1 is a sectional view of a machine embodying the invention, the lifting members and gripping devices being shown in plan view. Fig. 2 is a rear view of the same. Fig. 3 is an end elevation, dotted lines showing the bricks as when engaged by the device. Fig. 4 is a sectional view taken approximately on the line 4—4 of Fig. 1. Fig. 5 is a section on the line 5—5 of Fig. 1. Figs. 6, 7 and 8 are views similar to Figs. 1, 2 and 3 respectively, showing a modified embodiment of the invention. Fig. 9 is a sectional view taken through the gripper actuating mechanism, certain parts being broken away. Fig. 10 is a sectional view taken on the line 10—10 of Fig. 9, and Fig. 11 is a fragmentary section on the line 11—11 of Fig. 2.

Referring to the construction illustrated by Figs. 1 to 5 of the drawings the body of my brick handling machine may be said to comprise a front plate 1 and a relatively movable rear plate 2. These plates are connected together by fastenings 3, consisting preferably of headed members on the plate 1 and which pass through slots 4 of the plate 2, thereby permitting of the relative movement of these parts above mentioned. Vertical members 5 in the form of angle bars project upwardly from the ends of the plate 2 and are rigidly secured to said plate by suitable fastenings. At their upper portions the members 5 receive and have suitably secured thereto the cross bar 6 which constitutes a handle. A chain 7, broken away in the illustration, may be secured to the handle or bar 6 and facilitates the connection of lifting tackle to the machine for obvious purposes.

Offstanding from the front side of the plate 1 are the lifting members 8 each of which consists of an arm rigidly attached to said plate. The members 8 are arranged in spaced relation and each member has one plain side, and its opposite side is recessed so as to receive therein rocker arms 9 (see Fig. 4). The arms 9 are mounted on a shaft 10 which is journaled in and longitudinally of the arm 8, said shaft passing through the plate 1 and terminating at its rear end in a recess on the inner face of the plate 2 in which recess operates an interrupted tooth pinion 11 the teeth of which engage the teeth of a rack 12 which is fastened rigidly to the rear plate 2 by fastenings 13. The pinion 11 is secured to the shaft 10 to rotate therewith.

The shaft 10 preferably carries several of the rocker arms 9 with the upper ends of which is pivotally connected at 9ª the gripper 14. The gripper 14 consists of a plate arranged longitudinally of the lifting member 8 with which it is associated and owing to the manner in which it is mounted said plate 14 when engaging a brick received between it and the adjacent spaced member 8 will accommodate itself to inequalities in the surface of the brick with which it contacts.

It is to be understood that each lifting member 8 excepting one designated 8ª, is provided with an actuating mechanism comprising the parts 9, 10, 11, and 12, to operate its gripper. Thus it is that in the operation of the invention the various parts being normally arranged as shown in Fig. 1, the arms 8 are inserted in spaces between a row of bricks previously arranged in spaced relation to be handled by this invention. This done, by raising the machine either by grasping the handle 6 or connecting tackle with the chain 7, the initial upward pull on the machine causes the plate 2 to move upward relatively to the plate 1, carrying the racks 12 upward a slight distance and rotating the various pinions 11. The movement of the pinions 11 is transmitted to the shafts 10, the latter being locked to force the grippers 14 away from their respective members 8, into positive gripping engagement with the bricks. Subsequent upward movement of the machine raises the plates 1 and 2 together, with the connecting parts, and all of the bricks which are engaged by the grippers of the various lifting members, in a manner well understood in this particular art.

In the modification illustrated in Figs. 6 to 10 inclusive somewhat the same principle of action will be noted, the main parts of the machine of the modification, namely 1', 2', 5', 6', 7' and 8' being equivalent to the parts 1, 2, 5, 6, 7 and 8 above described. However, the actuating mechanism for the grippers 14' is somewhat different. The plates 1' and 2' have the same relative movement as in the first described construction.

On each of the lifting members 8' is mounted a rocker arm 15 pivotally connected at one end with the gripper 14', the other end of said arm being journaled in the member 8' as shown at the point 16 and being formed near its axis with the toothed sector 15'. The sector 15' meshes with the teeth of the longitudinal rack 17 on the member 8'. The rack 17 has other teeth which mesh with a pinion 18 on a stub shaft 19 journaled in the plate 1'. On this shaft 19 is a second pinion 20 the teeth of which engage a rack 21 secured to the plate 2' by fastenings 22.

In the construction as modified the lifting of the machine by means of either the parts 6' or 7' causes the initial upward movement of the plate 2 relative to the plate 1. Such movement causes the rack 21 to turn the shaft 19 through the medium of the pinion 20, and the pinion 18 imparts this movement to the rack 17 which transmits said movement to the rocker arm 15 forcing the latter outward with its gripper 14' so as to cause the latter to firmly engage the brick. The actuating mechanism just described is of course duplicated for each of the lifting members 8' excepting one which is designated 8ª'' located at one end of the machine.

It is contemplated to interpose springs 23 between the plates 1 and 2 or 1' and 2', so as to cause said plates to normally assume the positions illustrated in Figs. 2 and 7. The springs constitute normalizing means coacting with the gripping instrumentalities in an obvious manner. The springs 23 are caused to coöperate with the parts 1 and 2, or 1' and 2', by the provision of angle plates 23' and 23'' carried by said parts respectively. Lateral portions of the angle plates 23' and 23'' are so arranged that one end of the spring 23 engages said portion of the plates 23' and 23'', the other end of the spring bearing against a short plunger correspondingly engaged by the plate 23'. The action of the spring 23 is effective to hold the parts in the normal positions seen in Figs. 2, 3, 8 and 11.

Having thus described the invention, what I claim as new is:—

1. In a brick handling machine, the combination of coöperating plates arranged side by side, connections between said plates permitting relative movement of the same, means connected with one of the plates for raising the machine bodily, springs disposed intermediate said plates, members carried by the plates and coöperating with opposite ends of said springs so that the latter hold the plates normally in predetermined relative positions, brick grippers carried by the other of the plates, and means operable by the plates in their relative movement to effect actuation of the said grippers.

2. In a brick handling machine, the combination of coöperating plates mounted side by side and contacting with one another, means movably attaching the plates together, elevating means for the machine operatively connected with one of the plates, lifting members projecting from the other plate, grippers movably mounted on said lifting members, devices wholly housed between the plates and operatively connected with said grippers and with the plates whereby on relative movement of the plates the grippers will be actuated, springs also housed between the plates, and means on the plates coacting with said springs whereby the latter hold the plates normally in predetermined relative positions.

3. In a brick handling machine the combination of relatively movable plates, means for causing relative movement of said plates, lifting members carried by one of the plates, grippers mounted on the lifting members, and means intermediate said plates and the grippers for actuating the latter on relative movement of the plates, said last named means including rocker arms pivoted on the lifting members, connections intermediate said arms and the grippers and rack and pinion devices operable by relative movement of the plates and connected with the rocker arms to shift the latter with the grippers attached thereto.

4. In a brick handling machine the combination of relatively movable plates, means for causing relative movement of said plates, lifting members carried by one of the plates, grippers mounted on the lifting members, and means intermediate said plates and the grippers for actuating the latter on relative movement of the plates, said last named means including rocker arms pivoted on the lifting members, pivotal connections between said arms and the grippers, racks carried by one of the plates, pinions associated with the other of the plates and operable by said racks and connected with the rocker arms to shift the latter with their grippers.

5. In a brick handling machine, the combination of relatively movable plates, connections between said plates, raising means for the machine attached to one of the plates, lifting members projecting from the other plate, movable grippers carried by said lifting members, and operating means for said grippers housed between said plates and comprising racks carried by one of the plates, pinions carried by the other plate and meshing with the racks, and shafts operatively connecting said pinions with the grippers.

6. In a brick handling machine the combination of a body composed of plates slidable in contact with one another, pin and slot connections intermediate said plates permitting sliding of one upon the other, a handle connected with one of the plates whereby to lift the machine and thus permit relative movement of the plates, grippers carried by the other plate, and means intermediate the grippers and the first mentioned plate whereby on relative movement of the plates the grippers will be actuated.

7. In a brick handling machine the combination of a body composed of plates slidable one against the other, fastenings intermediate said plates permitting sliding of one upon the other, a handle connected with one of the plates whereby to lift the machine and thus permit relative movement of the plates, grippers carried by the other plate, and rack and pinion devices housed by and arranged intermediate said plates whereby on relative movement of the plates the grippers will be actuated, and spring means coacting with the plates to yieldingly hold the same in predetermined positions.

8. In a brick handling machine, the combination of coöperating plates arranged with adjacent sides in movable contacting relation, connections movably attaching the plates together, means for elevating the machine connected with one of the plates, lifting members projecting from the other plate at right angles to the latter, grippers applied to sides of the lifting members, a shaft disposed longitudinally of each lifting member, connections between said shaft and adjacent gripper, and rack and pinion devices housed between the plates, said devices comprising racks rigidly mounted on one of the plates, and pinions rigid with the aforesaid shafts carried by the lifting members of the other plate, said pinions being in meshing relation with respect to the racks.

9. In a brick handling machine the combination of a body composed of relatively movable plates, means connected with one of the plates whereby to raise the machine, grippers carried by the other of the plates, and means intermediate said grippers and plates operable on relative movement of the plates to effect movement of the grippers, said means comprising racks and pinions meshing with the racks, both mounted on and between the plates aforesaid, members operable by the pinions and connected directly with the grippers to actuate the same, springs between the plates, the plates having members to engage opposite ends of the springs so that the latter act to hold the plates in predetermined positions and to restore the same after relative movement.

In testimony whereof I affix my signature in presence of two witnesses.

WILLIAM H. ALLEN.

Witnesses:
 ZOA COYLE,
 E. P. HARNEY.